(12) United States Patent
Liu et al.

(10) Patent No.: US 8,712,682 B1
(45) Date of Patent: Apr. 29, 2014

(54) ESTIMATING TRAVEL TIME

(75) Inventors: Sean Yaoxing Liu, Sunnyvale, CA (US);
Yiyang Joy Ding, Brooklyn, NY (US);
Rita Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/434,769

(22) Filed: Mar. 29, 2012

(51) Int. Cl.
*G01C 21/34* (2006.01)
*G01C 21/26* (2006.01)
*G01C 21/36* (2006.01)

(52) U.S. Cl.
CPC ............ *G01C 21/3415* (2013.01); *G01C 21/26* (2013.01); *G01C 21/36* (2013.01)
USPC ............................ 701/414; 701/400; 701/408

(58) Field of Classification Search
CPC ..... G01C 21/26; G01C 21/36; G01C 21/3415
USPC .......................... 701/400, 414, 408
See application file for complete search history.

(56) References Cited

U.S. PATENT DOCUMENTS

| | | | |
|---|---|---|---|
| 2008/0234921 A1* | 9/2008 | Groenhuijzen et al. ...... | 701/118 |
| 2009/0133967 A1* | 5/2009 | Smith et al. .................... | 187/382 |
| 2009/0182492 A1* | 7/2009 | Alten ............................. | 701/200 |
| 2010/0299055 A1* | 11/2010 | Hilbrandie et al. ........... | 701/200 |
| 2011/0130950 A1* | 6/2011 | Wexler et al. ................. | 701/200 |
| 2011/0264363 A1* | 10/2011 | Cabral .......................... | 701/200 |
| 2013/0103300 A1* | 4/2013 | Rakthanmanon et al. .... | 701/408 |

* cited by examiner

*Primary Examiner* — Fadey Jabr
*Assistant Examiner* — Yazan A Soofi
(74) *Attorney, Agent, or Firm* — McDermott Will & Emery LLP (57) ABSTRACT

A system and method for estimating travel time are provided. A general travel time is determined for a first route. A personal travel time for the first route is determined based on travel data of a user while traveling the first route. A scaling factor is determined based on at least one travel characteristic associated with the user or the route. A travel time for is estimated a second route based on the general travel time, the personal travel time and the scaling factor.

20 Claims, 4 Drawing Sheets

ESTIMATING TRAVEL TIME

FIELD

The subject technology generally relates to travel time and, in particular, relates to estimating travel time for routes.

BACKGROUND

Conventional navigation systems can provide for estimating general travel times for routes. For example, a travel time estimate can be determined by dividing the distance of the route by the speed limit of the route. However, such a time estimate may include errors due to road conditions, traffic congestion, driving patterns, accuracy of the navigation system, and other variables which are not accounted for by navigation systems.

SUMMARY

The disclosed subject matter relates to a machine-implemented method of estimating travel time. The method comprises determining a general travel time for a first route, determining a personal travel time for the first route based on travel data of a user while traveling the first route, and determining a scaling factor based on at least one travel characteristic associated with the user or the route. The method further comprises estimating a travel time for a second route based on the general travel time, the personal travel time and the scaling factor. The estimating the travel time comprises calculating a difference between the general travel time and the personal travel time, multiplying the calculated difference by the scaling factor to obtain a scaled difference, and applying the scaled difference to the general travel time to estimate the travel time for the second route.

The disclosed subject matter further relates to a system for estimating travel time. The system comprises one or more processors, and a machine-readable medium comprising instructions stored therein, which when executed by the processors, cause the processors to perform operations comprising determining a general travel time for a first route, and determining a personal travel time for the first route based on travel data of a user while traveling the first route. The operations further comprise determining a scaling factor based on at least one travel characteristic associated with the user or the route, calculating a difference between the general travel time and the personal travel time, multiplying the calculated difference by the scaling factor to obtain a scaled difference, and applying the scaled difference to the general travel time to obtain an estimated travel time for a second route.

The disclosed subject matter also relates to a machine-readable medium comprising instructions stored therein, which when executed by a system, cause the system to perform operations comprising for each segment of multiple segments included within a route: determining a general travel time for the segment, determining a personal travel time for the segment based on travel data of a user while traveling the segment, determining a scaling factor for the segment based on at least one travel characteristic associated with the user or the segment, and estimating a travel time for the segment based on the general travel time, the personal travel time and the scaling factor. The estimating the travel time comprises calculating a difference between the general travel time and the personal travel time, multiplying the calculated difference by the scaling factor to obtain a scaled difference, and applying the scaled difference to the general travel time to estimate the travel time for the segment. The operations further comprise totaling the estimated travel times for the multiple segments, to determine an estimated travel time for the route.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Navigation timing estimates are often purely aggregated. In other words, travel times for directions from any device or as any user often correspond to generalized timing estimates. However, not all drivers necessarily arrive at the same time along the same routes, and it is also misleading when navigation fails to account for local parking times.

The disclosed subject matter provides for personalized timing estimates, and can account for routes which the user frequently travels along. Some drivers typically drive slower than stated speed limits, while other drivers can complete routes faster than general estimates. Furthermore, personalized timing estimates can account for parking, getting lost, and general unfamiliarity with the "faster" routes.

In this regard, averaging personal travel times over the long-run may provide more accurate predictions for a particular driver. However, with little data, it can be difficult to correctly account for timing observations of a driver. Thus, it may be desirable to provide for an improved estimate of travel time for a driver.

The disclosed subject matter describes systems and techniques for estimating travel time. A general travel time for a first route is determined, and a personal travel time for the first route is determined based on travel data of a user while traveling the first route. A scaling factor is determined based on at least one travel characteristic associated with the user or the route. A travel time for a second route is estimated based on the general travel time, the personal travel time and the scaling factor.

Estimating the travel time can include calculating a difference between the general travel time and the personal travel time, multiplying the calculated difference by the scaling factor to obtain a scaled difference, and applying the scaled difference to the general travel time to estimate the travel time for the second route.

The first route and/or second route can include multiple segments. The determining the general travel time, the determining the personal travel time, the determining the scaling factor, and the estimating the travel time can be respectively performed for each of the multiple segments. All of the estimated travel times for each of the multiple segments can be totaled, to determine the estimated travel time for the entire route. Although the examples described herein reference driving, it should be noted that times for any type of travel can be estimated, including walking, running, biking, etc.

Figure 1:
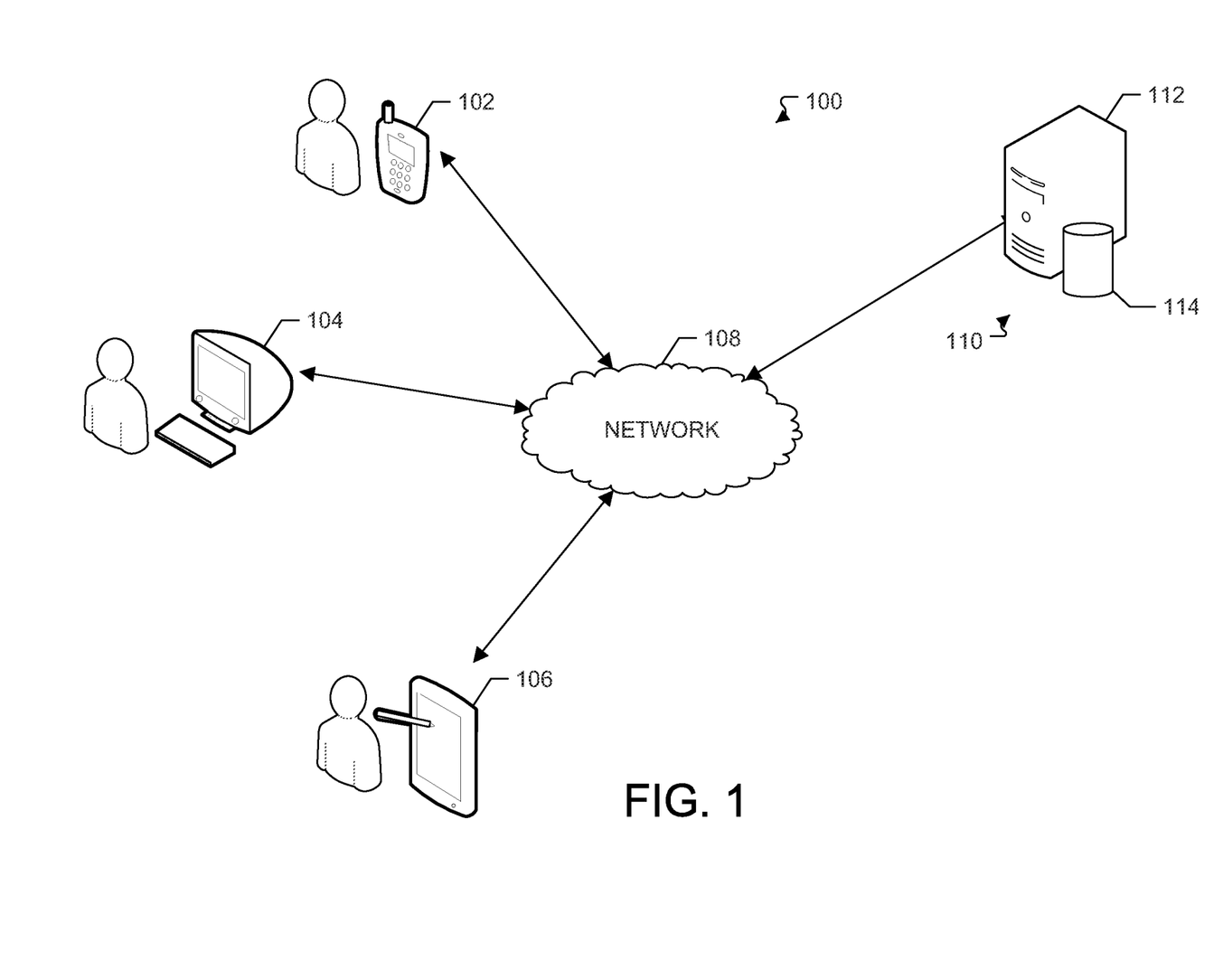
FIG. 1 illustrates an example distributed network environment which can provide for estimating travel time for a navigation system.

FIG. 1 illustrates an example distributed network environment which can provide for estimating travel time for navigation systems. Although FIG. 1 illustrates a client-server network environment 100, other aspects of the subject technology may include other configurations including, for example, peer-to-peer environments or single system environments. A network environment 100 includes a number of electronic devices 102-106 communicably connected to a server 110 by a network 108. Server 110 includes a processing device 112 and a data store 114. Processing device 112 executes computer instructions stored in data store 114, for example, to provide estimates of travel time to any of electronic devices 102-106.

In some example aspects, each of electronic devices 102-106 may be any machine configured to generate and transmit a signal that includes location information (e.g., GPS coordinates) to server 110. In some example embodiments, electronic devices 102-106 can be computing devices such as laptop or desktop computers, smartphones, PDAs, portable media players, tablet computers, location-aware devices (e.g., GPS devices) or other appropriate computing devices. In the example of FIG. 1, electronic device 102 is depicted as a smartphone, electronic device 104 is depicted as a desktop computer, and electronic device 106 is depicted as a PDA.

In some example aspects, each of electronic devices 102-106 may include one or more client applications 110 (e.g., mapping applications, navigation applications, or other processes) configured to generate and transmit location signals (e.g., GPS signals) to a server. For example, the location signals may include GPS coordinates (e.g., longitude and latitude coordinates) and, in some cases, a time stamp indicating when the location signal was generated.

In some example aspects, server 110 can determine a general travel time for a first route, and can further determine a personal travel time for the first route based on travel data of a user while traveling the first route (e.g., based on GPS signals received from any of devices 102-106). Server 110 can further determine a scaling factor based on at least one travel characteristic associated with the user or the route, and estimate a travel time for a second route based on the general travel time, the personal travel time and the scaling factor.

In other example aspects, devices 102-106 can provide for estimates of travel time themselves, without necessarily communicating with server 110. For example, any of devices 102-106 may include logic to determine a general travel time for a first route, and to determine a personal travel time for the first route based on travel data of a user while traveling the first route (e.g., GPS signals received by any of devices 102-106 from a GPS server). Any of devices 102-106 can further include logic to determine a scaling factor based on at least one travel characteristic associated with the user or the route, and to estimate a travel time for a second route based on the general travel time, the personal travel time and the scaling factor.

Server 110 may be any system or device having a processor, a memory, and communications capability appropriate for providing estimates of travel time. In some example aspects, server 110 can be a single computing device such as a computer server. In other embodiments, server 110 can represent more than one computing device working together to perform the actions of a server computer (e.g., cloud computing).

Network 108 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
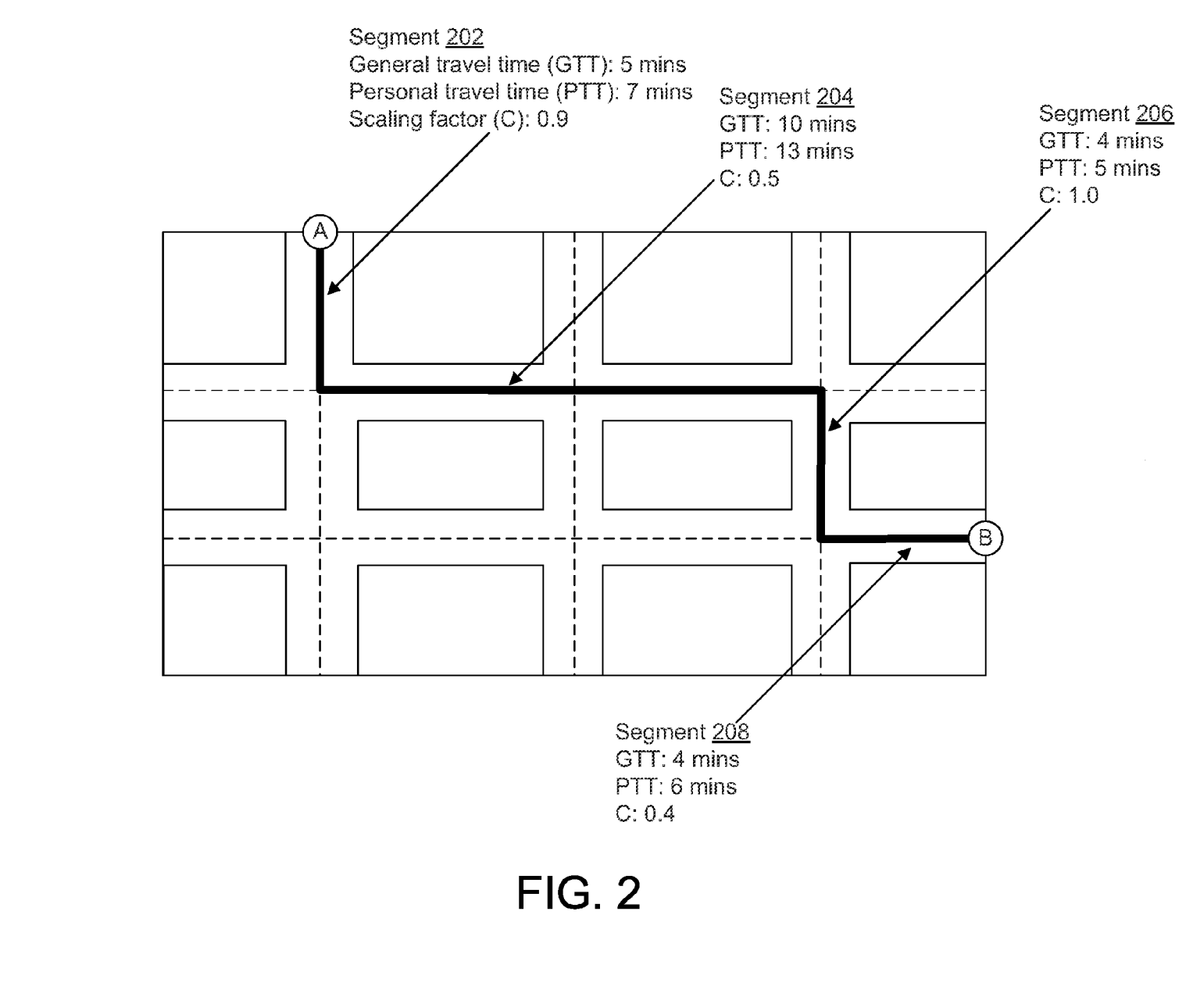
FIG. 2 illustrates an example route including multiple segments.

FIG. 2 illustrates an example route including multiple segments. As can be seen in FIG. 2, an example route is illustrated for traveling from point A to point B. The route includes multiple segments, including segment 202, segment 204 and segment 206. Each of segments 202-206 has a general travel time (GTT), a personal travel time (PTT) and a scaling factor (C) associated therewith.

The general travel time for each segment can be determined using a time estimation algorithm. The time estimation algorithm may assume a constant or average speed (e.g., a posted speed limit) for each segment of the route, and may use the distance of each segment to calculate a general travel time for the segment. In the example of FIG. 2, segment 202 includes a general travel time of 5 minutes, segment 204 includes a general travel time of 10 minutes, and segment 206 includes a general travel time of 4 minutes.

Each of segments 202-206 further has a personal travel time (PIT) associated therewith. In this regard, it is possible for driving speeds to vary from driver to driver. As such, the general time estimates may not be accurate for all drivers, and may be adjusted on a per-driver basis. For example, a user may vary from the general travel time due to the user typically driving slower/faster than the posted speed limit, the user consistently being slowed down along a specific segment (e.g., a road with poorly timed traffic lights), or the user needing to search for parking at the last segment. In the example of FIG. 2, segment 202 includes a personal travel time of 7 minutes, segment 204 includes a personal travel time of 10 minutes, and segment 206 includes a personal travel time of 5 minutes.

Given the GTT and PTT values for each of segments 202-206, it is possible to compute an estimated time for each segment of the route from point A to point B. For example, the estimated time of travel for a given segment can be calculated by:

$$ETT = GTT + (PTT - GTT) * C \qquad \text{Equation (1)}$$

In equation (1), ETT represents the estimated travel time, GTT represents the general travel time, PTT represents the personal travel time and C represents a scaling factor. In this regard, C can correspond to a weighting factor for smoothing equation (1). It can be noted that in the long-run, averages of personal travel time estimates will typically surface to help update timing estimates. However, with little data it is often difficult to correctly account for timing observations for a given user. Scaling factor C can be used to help account for these considerations.

C can correspond to a value between 0 and 1, such that the personal travel time is given less weight when C is closer to 0 and given more weight when C is closer to 1. For example, C can have, but is not limited to the following characteristics: C can be set closer to 1.0 if it is observed that many other users are proportionally driving a particular segment at a slower or a faster rate than the posted speed limit. In this case, C is not necessarily personalized to an individual user, but can account for general traffic flow (e.g., traffic accidents).

C can also be set closer to 1.0 if the personal driving behavior (e.g., 5% slower driving) is consistent with this individual. In addition, C can be set closer to 1.0 if the behavior in a particular neighborhood (e.g., several segments in a particular region) is consistent with this individual. C can also be set closer to 1.0 if there were consecutive observations that are fairly drastically different (e.g., a new speed limit was just posted). On the other hand, C can be set closer to 0.0 if the last observed behavior for the individual was a long time ago (e.g., beyond a predetermined threshold of time).

Thus, it is possible to estimate travel times for each segment of a route. These estimated travel times can be added together to determine an estimated travel time for the entire route. Using the example of FIG. 2, the ETT for segment 202 is 5 minutes+(7 minutes−5 minutes)*0.9, which equals 6.8 minutes; the ETT for segment 204 is 10 minutes+(13 minutes 10 minutes), which equals 0.5=11.5 minutes; the ETT for segment 206 is 4 minutes+(5 minutes−4 minutes)*1.0, which equals 5 minutes; and the ETT for segment 208 is 4 minutes+(6 minutes−4 minutes)*0.4, which equals 4.8 minutes. Furthermore, the total estimated time for the route from point A to B is 6.8 minutes+11.5 minutes+5 minutes+4.8 minutes, which totals 28.1 minutes.

Figure 3:
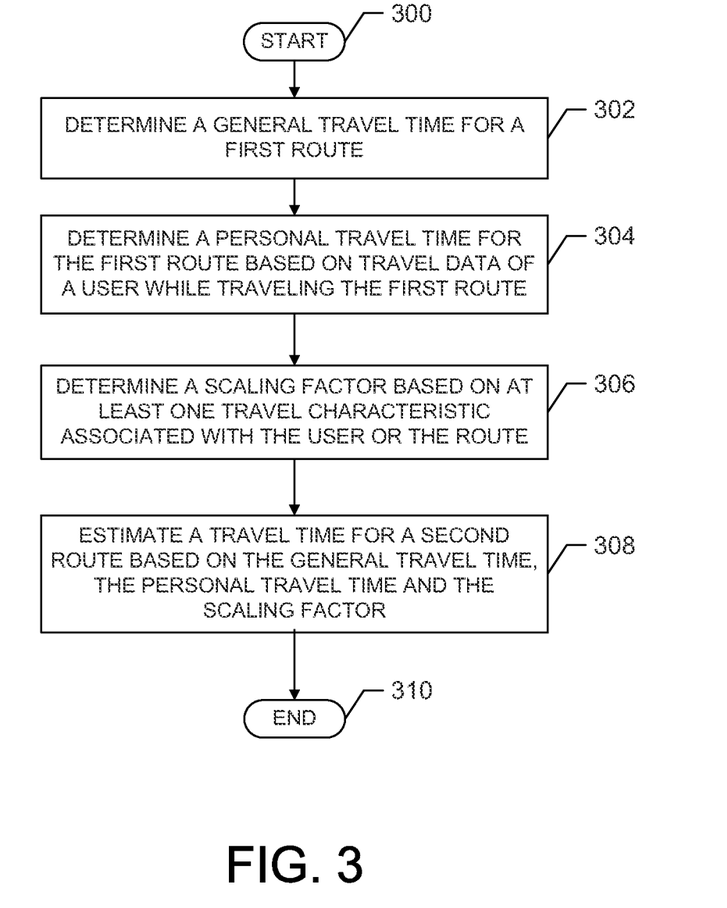
FIG. 3 illustrates an example process by which travel time is estimated for a navigation system.

FIG. 3 illustrates an example process by which travel time is estimated for a navigation system. Following start block 300, a general travel time is determined for a first route at step 302. The first route can include multiple segments. At step 304, a personal travel time is determined for the first route based on travel data of a user while traveling the first route.

At step 306, a scaling factor is determined based on at least one travel characteristic associated with the user or the route. The scaling factor can be increased if the user, based on the travel data, consistently drives a segment of the route at a similar pace. The scaling factor can be based on speed limits of one or more segments. The scaling factor can be decreased if the at least one travel characteristic is based on an observation which occurred beyond a predetermined period of time. The scaling factor can be increased if other users drive at a pace consistent with the user, based on the travel data of the user. The scaling factor can be a number ranging from 0 to 1.

At step 308, a travel time is estimated for a second route based on the general travel time, the personal travel time and the scaling factor. The estimating of the travel time can include, calculating a difference between the general travel time and the personal travel time, multiplying the calculated difference by the scaling factor to obtain a scaled difference, and applying the scaled difference to the general travel time to estimate the travel time for the second route. The second route can include multiple segments.

The determining the general travel time, the determining the personal travel time, the determining the scaling factor, and the estimating the travel time can be respectively performed for each of the multiple segments. All of the estimated travel times for each of the multiple segments can be totaled, to determine the estimated travel time for the second route.

The first route and the second route can correspond to the same route. Alternatively, the first route and second route can correspond to different routes with overlapping regions. The process then ends at end block 310.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
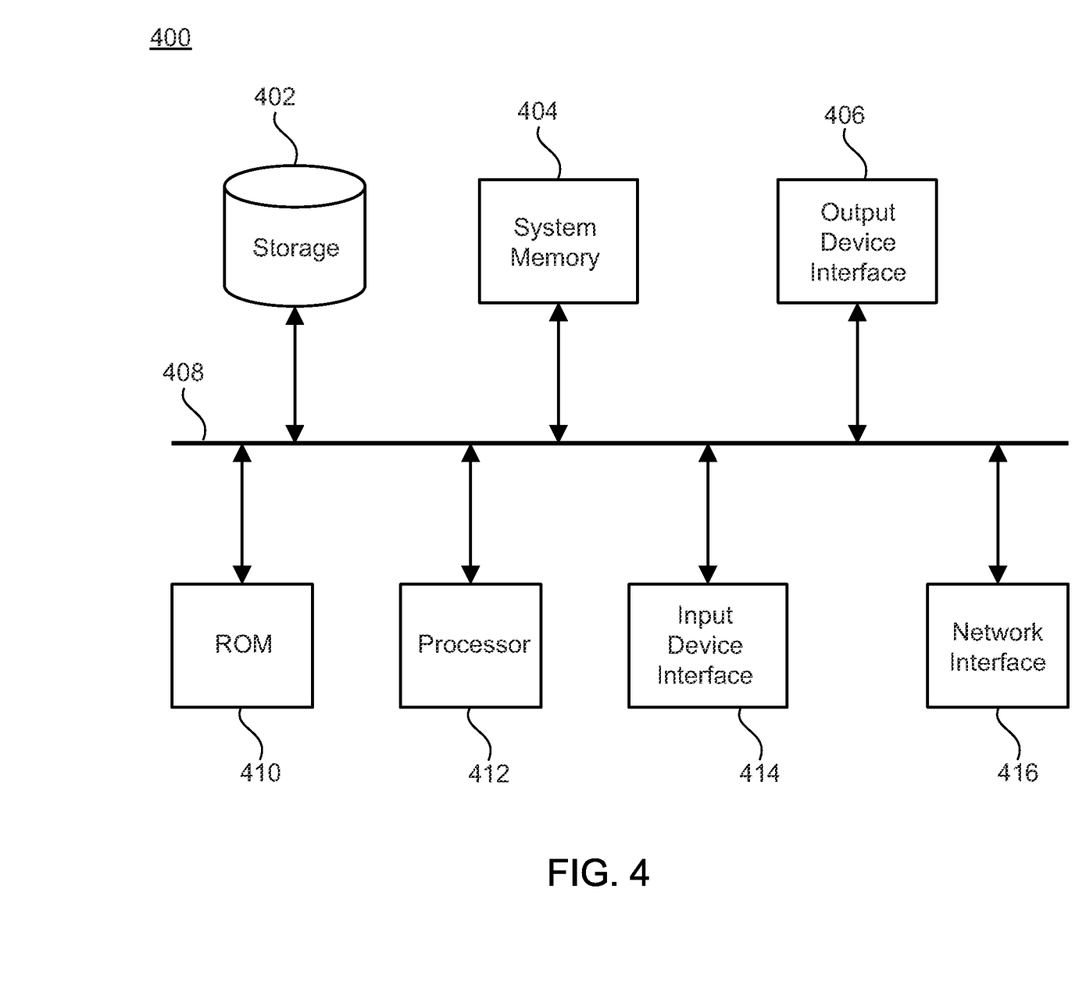
FIG. 4 conceptually illustrates an electronic system with which some implementations of the subject technology are implemented.

FIG. 4 conceptually illustrates an electronic system with which some implementations of the subject technology are implemented. Electronic system 400 can be a computer, phone, PDA, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for estimating travel time in accordance with some implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method of estimating travel time, the method comprising:
   determining, using one or more processors, a general travel time for a first route;
   determining, using the one or more processors, a personal travel time for the first route based on travel data of a user while traveling the first route;
   determining, using the one or more processors, a scaling factor based on at least one travel characteristic associated with the user or the route; and
   estimating, using the one or more processors, a travel time for a second route based on the general travel time, the personal travel time and the scaling factor,
   wherein the estimating the travel time comprises solving the equation:

$$ETT=GTT+(PTT-GTT)*C,$$

wherein ETT represents the estimated travel time, GTT represents the general travel time, PTT represents the personal travel time and C represents the scaling factor.

2. The method of claim 1, wherein the first route comprises multiple segments.

3. The method of claim 1, wherein the second route comprises multiple segments.

4. The method of claim 3, wherein the determining the general travel time, the determining the personal travel time, the determining the scaling factor, and the estimating the travel time are respectively performed for each of the multiple segments.

5. The method of claim 4, further comprising totaling all of the estimated travel times for each of the multiple segments to determine the estimated travel time for the second route.

6. The method of claim 3, wherein the scaling factor is increased if the user, based on the travel data, consistently drives a segment of the route at a similar pace.

7. The method of claim 3, wherein the scaling factor is based on speed limits of one or more segments.

8. The method of claim 1, wherein the scaling factor is decreased if the at least one travel characteristic is based on an observation which occurred beyond a predetermined period of time.

9. The method of claim 1, wherein the scaling factor is increased if other users drive at a pace consistent with the user, based on the travel data of the user.

10. The method of claim 1, wherein the scaling factor is a number ranging from 0 to 1.

11. The method of claim 1, wherein the first route and the second route correspond to the same route.

12. The method of claim 1, wherein the first route and second route correspond to different routes with overlapping regions.

13. A system for estimating travel time, the system comprising:
   one or more processors; and
   a machine-readable medium comprising instructions stored therein, which when executed by the processors, cause the processors to perform operations comprising:
      determining a general travel time for a first route;
      determining a personal travel time for the first route based on travel data of a user while traveling the first route;
      determining a scaling factor based on at least one travel characteristic associated with the user or the route; and
      estimating a travel time for a second route based on the general travel time, the personal travel time and the scaling factor,
      wherein the estimating the travel time comprises solving the equation:

$ETT=GTT+(PTT-GTT)*C,$ wherein ETT represents the estimated travel time, GTT represents the general travel time, PTT represents the personal travel time and C represents the scaling factor.

14. The system of claim 13, wherein the first route comprises multiple segments.

15. The system of claim 14, wherein the determining the general travel time, the determining the personal travel time, the determining the scaling factor, the estimating the travel time are respectively performed for each of the multiple segments.

16. The system of claim 15, further comprising totaling all of the estimated travel times for each of the multiple segments to determine the estimated travel time for the second route.

17. The system of claim 14, wherein the scaling factor is increased if the user, based on the travel data, consistently drives a segment of the route at a similar pace.

18. The system of claim 14, wherein the scaling factor is based on speed limits of one or more segments.

19. The system of claim 13, wherein the scaling factor is decreased if the at least one travel characteristic is based on an observation which occurred beyond a predetermined period of time.

20. A non-transitory machine-readable medium comprising instructions stored therein, which when executed by a system, cause the system to perform operations comprising:
   for each segment of multiple segments included within a route:
      determining a general travel time for the segment;
      determining a personal travel time for the segment based on travel data of a user while traveling the segment;
      determining a scaling factor for the segment based on at least one travel characteristic associated with the user or the segment; and
      estimating a travel time for the segment based on the general travel time, the personal travel time and the scaling factor,
      wherein the estimating the travel time comprises solving the equation:

$ETT=GTT+(PTT-GTT)*C,$ wherein ETT represents the estimated travel time, GTT represents the general travel time, PTT represents the personal travel time and C represents the scaling factor;
   and
   totaling the estimated travel times for the multiple segments, to determine a total estimated travel time for the route.

* * * * *